United States Patent
Gao

(10) Patent No.: US 10,095,433 B1
(45) Date of Patent: Oct. 9, 2018

(54) OUT-OF-ORDER DATA TRANSFER MECHANISMS FOR DATA STORAGE SYSTEMS

(71) Applicant: Western Digital Technologies, Inc., Irvine, CA (US)

(72) Inventor: Jianxun Gao, Ladera Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 13/659,865

(22) Filed: Oct. 24, 2012

(51) Int. Cl.
G06F 12/00 (2006.01)
G06F 3/06 (2006.01)
G06F 12/02 (2006.01)

(52) U.S. Cl.
CPC .......... G06F 3/0628 (2013.01); G06F 3/0601 (2013.01); G06F 3/0679 (2013.01); G06F 12/0246 (2013.01)

(58) Field of Classification Search
CPC ............... G06F 3/0628; G06F 2213/28; G06F 2213/2802
See application file for complete search history.

(56) References Cited

U.S. PATENT DOCUMENTS

| | | | | |
|---|---|---|---|---|
| 5,625,800 A * | 4/1997 | Brayton et al. | | 703/23 |
| 5,838,950 A | 11/1998 | Young et al. | | |
| 6,078,990 A * | 6/2000 | Frazier | | 711/114 |
| 6,687,767 B2 | 2/2004 | Butterfield | | |
| 6,823,403 B2 | 11/2004 | Gulick et al. | | |
| 7,127,534 B2 * | 10/2006 | Jackson | G06F 13/385 | 710/27 |
| 7,464,198 B2 * | 12/2008 | Martinez et al. | | 710/22 |
| 7,603,490 B2 * | 10/2009 | Biran | G06F 13/28 | 710/23 |
| 7,620,749 B2 * | 11/2009 | Biran | G06F 13/28 | 710/22 |
| 7,676,611 B2 * | 3/2010 | Hui et al. | | 710/58 |
| 7,743,191 B1 | 6/2010 | Liao | | |
| 8,074,026 B2 * | 12/2011 | Kim et al. | | 711/118 |
| 8,082,372 B2 | 12/2011 | Barry et al. | | |
| 8,090,789 B1 | 1/2012 | O'Shea et al. | | |
| 8,578,097 B2 * | 11/2013 | Kim et al. | | 711/118 |
| 8,578,356 B1 * | 11/2013 | Pritchard et al. | | 717/154 |

(Continued)

OTHER PUBLICATIONS

"Ordered." Merriam-Webster.com. Merriam-Webster, n.d. [online], [retrieved on Dec. 1, 2014]. Retrieved from the Internet <http://www.merriam-webster.com/dictionary/ordered>.*

(Continued)

Primary Examiner — Ann J Lo
Assistant Examiner — Tracy A Warren
(74) Attorney, Agent, or Firm — McDermott Will & Emery LLP

(57) ABSTRACT

A data storage system implements out-of-order data transfer. In one embodiment, the data storage system can retrieve from a host system a scatter gather list (SGL) associated with a data read command and generate a memory access table based on the retrieved SGL. The data storage system can further retrieve data from memory, and at least some data may be retrieved out of order. Retrieved data can be provided to the host system using the memory access table, and at least some data may be provided out of order. Data retrieval performance can be increased.

18 Claims, 8 Drawing Sheets

(56) References Cited

U.S. PATENT DOCUMENTS

| | | | |
|---|---|---|---|
| 2002/0091844 | A1 | 7/2002 | Craft et al. |
| 2007/0011398 | A1 | 1/2007 | Van Niekerk |
| 2007/0208820 | A1 | 9/2007 | Makhervaks et al. |
| 2011/0082985 | A1 | 4/2011 | Haines et al. |
| 2011/0145598 | A1 | 6/2011 | Smith et al. |
| 2011/0225378 | A1 | 9/2011 | Hara |
| 2011/0314199 | A1 | 12/2011 | Jeddeloh |
| 2012/0011335 | A1* | 1/2012 | Asnaashari ........... G06F 13/161 711/155 |

OTHER PUBLICATIONS

"Ordered." The American Heritage® Dictionary of the English Language, Fifth Edition copyright © 2014 by Houghton Mifflin Harcourt Publishing Company. All rights reserved. [online], [retrieved on Dec. 1, 2014]. Retrieved from the Internet <https://www.ahdictionary.com/word/search.html?q=ordered>.*

"Associated." The American Heritage® Dictionary of the English Language, Fifth Edition copyright © 2014 by Houghton Mifflin Harcourt Publishing Company. All rights reserved. [online], [retrieved Dec. 3, 2014]. Retrieved from the internet <https://www.ahdictionary.com/word/search.html?q=associated&submit.x=48&submit.y=21>.*

"Associate." Merriam-Webster.com. Merriam-Webster, n.d. [online], [retrieved on Dec. 3, 2014]. Retrieved from the internet <http://www.merriam-webster.com/dictionary/associate>.*

\* cited by examiner

OUT-OF-ORDER DATA TRANSFER MECHANISMS FOR DATA STORAGE SYSTEMS

BACKGROUND

Technical Field

This disclosure relates to data storage systems for computer systems. More particularly, the disclosure relates to out-of-order data transfer for data storage systems.

Description of the Related Art

Data storage systems provide storage for user data of a host system. A host system can utilize direct memory access (DMA) for retrieving user data stored in a data storage system and for transferring user data to data storage system memory. DMA can offload data retrieval and transfer tasks from the central processing unit (CPU) of the host system, which can increase efficiency. DMA can further utilize scatter gather process for transferring data to and from multiple areas in the data storage system memory. In certain cases, using the scatter gather process can result in transfer of data in a single DMA transaction. However, during data retrieval, the scatter gather process can expect user data stored in the data storage system memory to arrive in a certain order, which may introduce undesirable inefficiencies and overhead. Accordingly, it is desirable to provide more efficient data transfer mechanisms, particularly when data is transferred out of order.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems provide storage for user data communicated by host systems. A host system can utilize DMA with scatter gather process for efficiently retrieving user data stored in multiple areas of memory of a data storage system and for storing user data in multiple areas of data storage system memory. User data may be stored in non-consecutive memory locations in data storage system memory. Further, user data may be retrieved from data storage system memory in order that is different from the order expected by the host system. For example, the expected order may be the order of read data commands communicated by the host system to the data storage system. In some instances, such out-of-order data retrieval may reduce the efficiency of the data retrieval process. For example, the data storage system may need to buffer user data retrieved out-of-order so that the data can be provided to the host system in the expected order.

Embodiments of the present invention are directed to out-of-order data transfer mechanisms. In one embodiment, a host system can use scatter gather mechanism for retrieving and storing data in a data storage system. The data storage system can retrieve from the host system a scatter gather list (SGL) associated with a data read command and generate a memory access table based on the scatter gather list. The data storage system can further retrieve data from data storage system memory (e.g., non-volatile memory array). At least some data may be retrieved out of order. Retrieved data can be provided to the host system using the memory access table, and at least some data may be provided out of order. Accordingly, data transfer performance can be increased.

System Overview

Figure 1A:
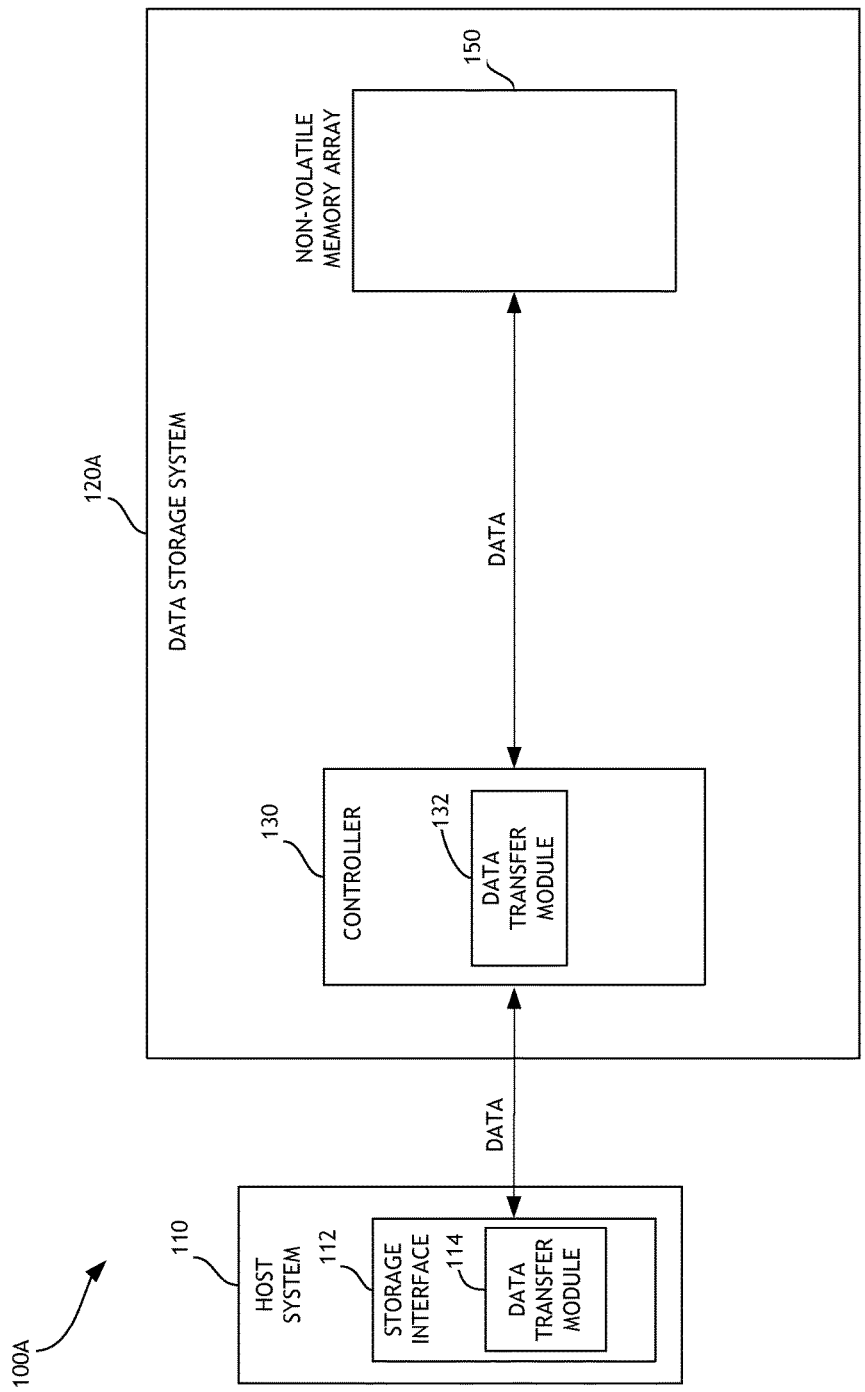
FIG. 1A illustrates a combination of a host system and a data storage system that implements out-of-order data transfer according to one embodiment of the invention.

FIG. 1A illustrates a combination 100A of a host system and a data storage system that implements out-of-order data transfer according to one embodiment of the invention. As is shown, the data storage system 120A (e.g., a solid-state drive) includes a controller 130 and a non-volatile memory array 150. The non-volatile memory array 150 may comprise non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The data storage system 120A can further comprise other types of storage.

The controller 130 can be configured to receive data and/or storage access commands from a storage interface module 112 (e.g., a device driver) of a host system 110. Storage access commands communicated by the storage interface 112 can include write data and read data commands issued by the host system 110. Storage access commands can be communicated by the data transfer module 114. Read and write commands can specify a logical address (e.g., logical block addresses or LBAs) used to access the data storage system 120A. The controller 130 can execute the received commands in the non-volatile memory array 150.

Data storage system 120A can store data communicated by the host system 110. In other words, the data storage system 120A can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory array 150 and/or other storage modules. The controller 130 includes a data transfer module 132 configured to perform transfer of data between the data storage system 120A and the host system 110 (e.g., via the data transfer module 114). Transfer of data can include both retrieving of data stored in the non-volatile memory array 150 and storing data in the non-volatile memory array 150.

Figure 1B:
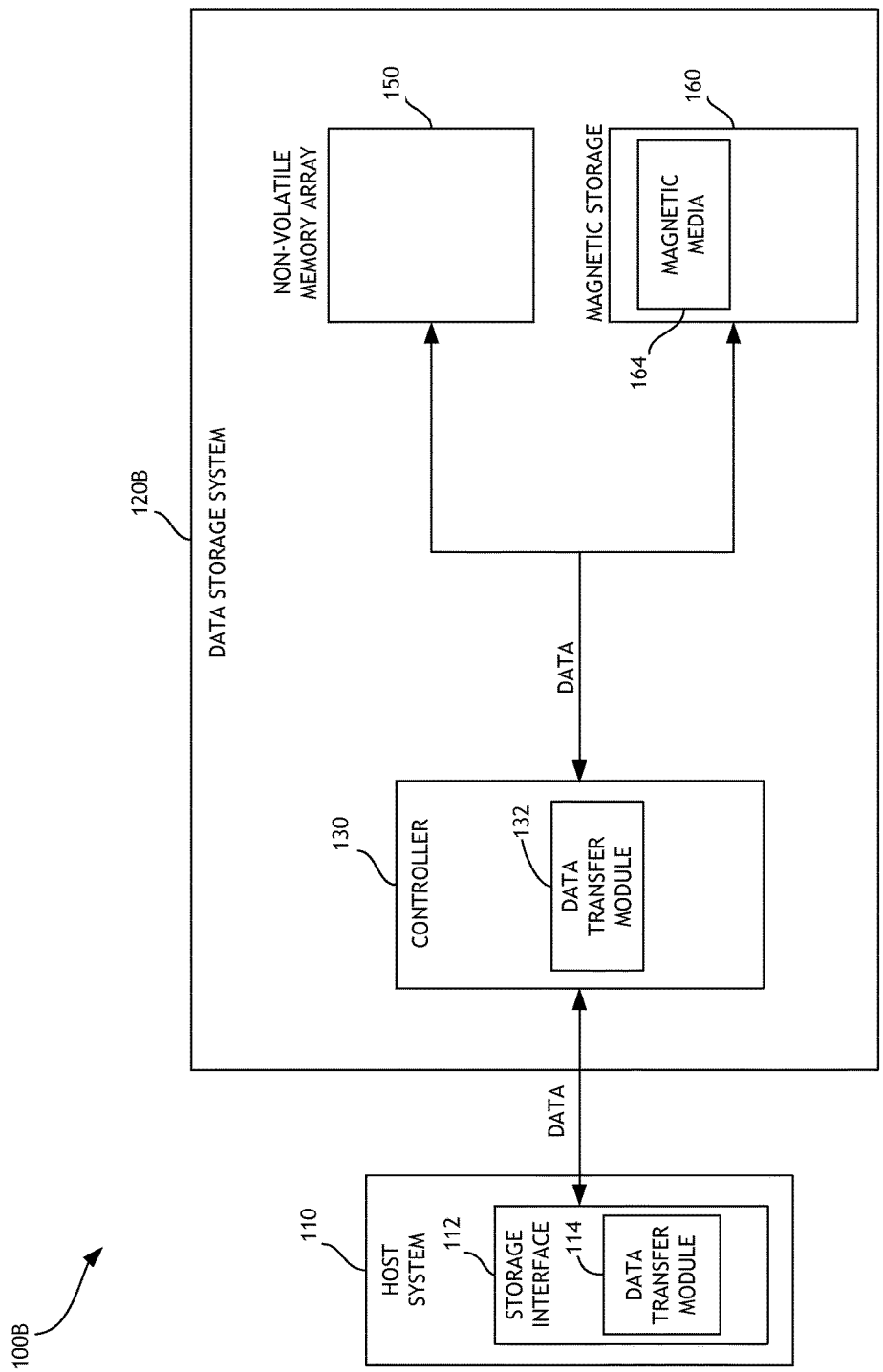
FIG. 1B illustrates a combination of a host system and a data storage system that implements out-of-order data transfer according to another embodiment of the invention.

FIG. 1B illustrates a combination 100B of a host system and a data storage system that implements out-of-order data transfer according to another embodiment of the invention. As is illustrated, data storage system 120B (e.g., hybrid disk drive) includes a controller 130, a non-volatile memory array 150, and magnetic storage 160, which comprises magnetic media 164. These and other components of the combination 100B are described above.

Figure 2:
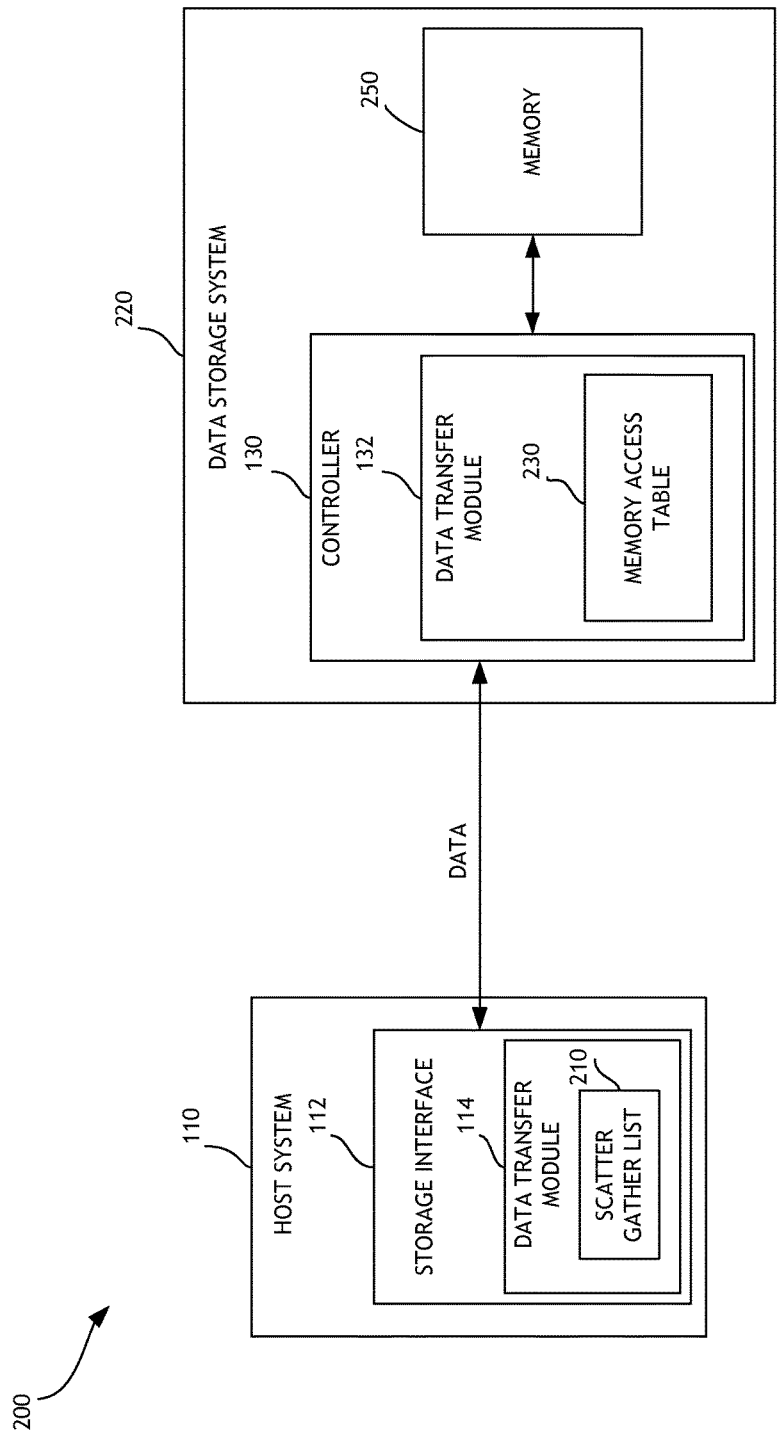
FIG. 2 illustrates a combination of a host system and a data storage system that implements out-of-order data transfer according to yet another embodiment of the invention.

FIG. 2 illustrates a combination 200 of a host system and a data storage system that implements out-of-order data transfer according to yet another embodiment of the invention. As is illustrated, host system 110 includes a storage interface 112 and data transfer module 114 as described above. The data transfer module 114 can implement scatter gather process for transferring data to and from the data storage system 220 (e.g., data storage system 120A and/or 120B). The scatter gather process includes a scatter gather list 210, as explained in more detail below. The data storage system 220 includes a controller 130 and data transfer module 132 as described above. The data transfer module includes a memory access table 230, as explained in more detail below. The data storage system 220 also includes memory 250, which can be any combination of non-volatile memory (e.g., non-volatile memory array 150), magnetic storage (e.g., magnetic storage 160), etc.

Out-of-Order Data Transfer

Figure 3:
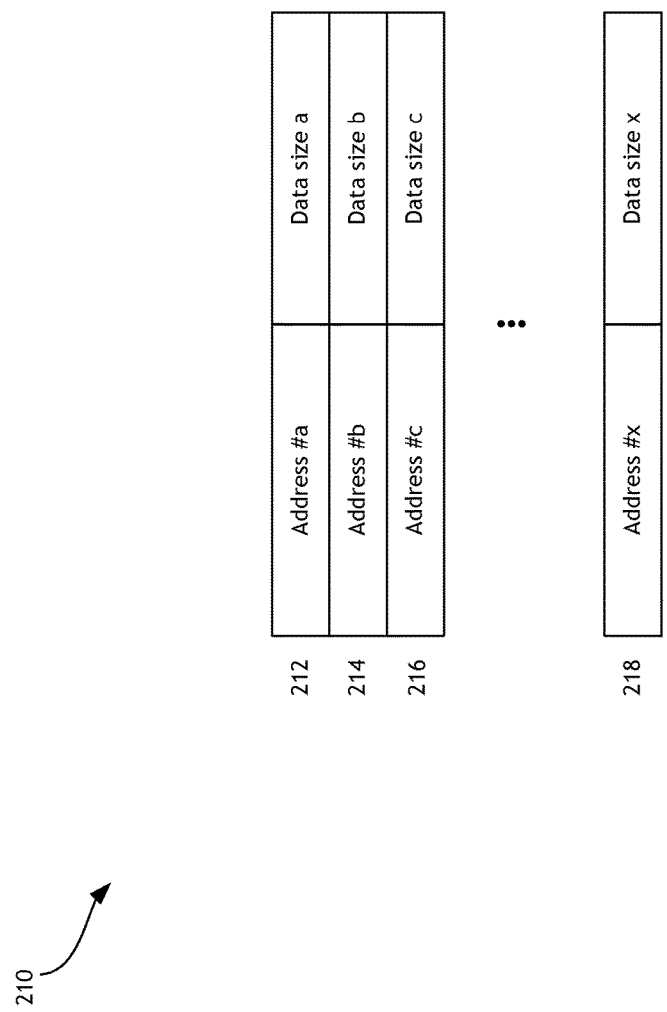
FIG. 3 illustrates a scatter gather list according to one embodiment of the invention.

FIG. 3 illustrates a scatter gather list 210 according to one embodiment of the invention. As is illustrated in FIG. 2, the scatter gather list (SGL) 210 can be stored in the host system 110. The SGL 210 can be generated by the data transfer module 114. The SGL 210 can include entries with addresses, such as logical addresses, in the data storage system memory along with size of data associated with the addresses. As is illustrated in FIG. 3, the SGL 210 includes an entry 212 corresponding to address #a and data size a, entry 214 corresponding to address #b and data size b, entry 216 corresponding to address #c and data size c, and so on. The last entry 218 corresponds to address #x and data size x. Although FIG. 3 depicts the SGL 210 with entries corresponding to consecutive addresses, SGL entries need not correspond to consecutive addresses. The SGL 210 can be used for data transfers, such as retrieving of data stored in the data storage system and storing data in the data storage system. In some embodiments, the SGL 210 can be used in DMA process for transferring data to and/or from multiple areas in the data storage system memory. Such areas may be consecutive, nonconsecutive, or any combination of consecutive and nonconsecutive memory locations. For example, the SGL 210 can be utilized for retrieving data from addresses associated with entries 212, 214, 216, and so on, ending with address 218.

Figure 4:
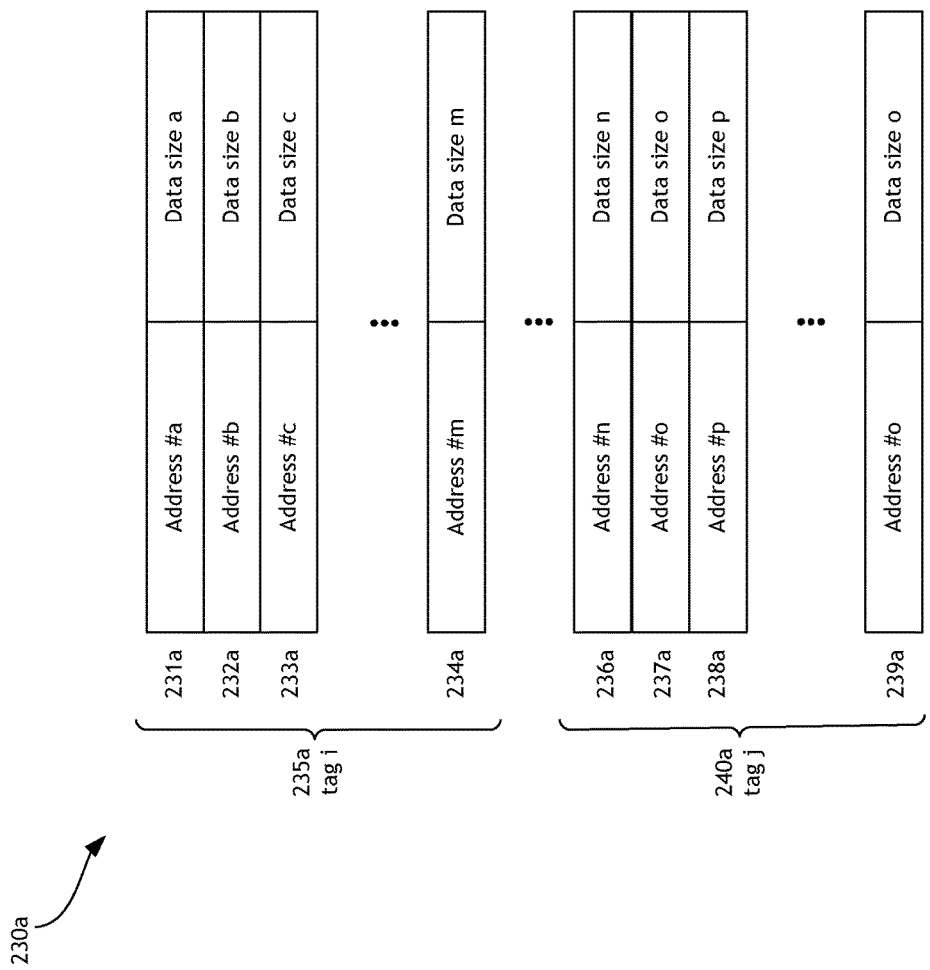
FIG. 4 illustrates a memory access table according to one embodiment of the invention.

FIG. 4 illustrates a memory access table 230a according to one embodiment of the invention. The memory access table 230a can be stored in the data storage system 220, as is illustrated in FIG. 2. The memory access table 230a can be generated based at least in part on the SGL 210. The memory access table 230a can be generated by the data transfer module 132. Although illustrated in FIG. 4 as a table, the memory access table 230a can be any suitable data structure, such as array, list, linked list, tree, graph, etc. or any combination thereof.

In one embodiment, the non-volatile memory array 150 includes or is divided into physical memory units. For example, the non-volatile memory array 150 may be divided into blocks, which may be further divided into pages. Memory units can be grouped together into chunks. For example, the non-volatile memory array 150 can include 512 Byte pages, which can be grouped into 4 KB chunks. Other suitable page sizes can be used, such as 1 KB, 2 KB, etc., and other suitable chunk sizes can be used, such as 520 Bytes, 528 Bytes, 1 KB, 2 KB, etc. Grouping of physical memory units into chunks may be done for various reasons, such as efficiently accessing memory, for example, when non-volatile memory 150 includes dies, planes, channels, etc. which may be accessed in parallel or substantially in parallel.

In one embodiment, as is explained above, the host system 110 can be configured to access memory of the data storage system (e.g., data storage system 220) using the logical interface. For example, the host system 110 can access memory of the data storage system in data blocks, sectors, etc., such as for example 512 Bytes, 2 KB, 4 KB, etc. The entries of SGL 210 can specify addresses of such data units used by the host system 110. With reference to FIG. 3, SGL entries 212, 214, 216, and so on can specify logical addresses in the data storage system memory.

In one embodiment, the memory access table 230a can be generated based on the SGL 210. Each entry in the SGL 210, which may correspond to an address of a logical data unit, can be translated or transformed into one or more addresses corresponding to one or more physical memory units or one or more logical groupings of physical memory units. For example, if the SGL 210 specifies addresses of 4 KB data units and the data storage system 220 uses 512 Byte chunks, each entry of SGL 210 may be associated with four entries in the memory access table 230a. As is illustrated in FIG. 4, this correspondence can be indicated by groupings 235a (corresponding to tag i, which is associated with entries 231a through 234a that form a chunk), 240a (corresponding to tag j, which is associated with entries 236a through 239a that form another chunk), etc.

As is shown in FIG. 4, the memory access table 230a further includes entries 231a through 234a, 236a through 239a, and so on. Each entry can comprise an address, such as a physical address in memory 250, and size of data associated with the address. For example, entry 231a includes address #a and data size a. In one embodiment, data size a can be associated with size of a set of data stored at consecutive set of memory locations starting with address #a. In another embodiment, data need not be retrieved from consecutive memory locations.

Figure 5:
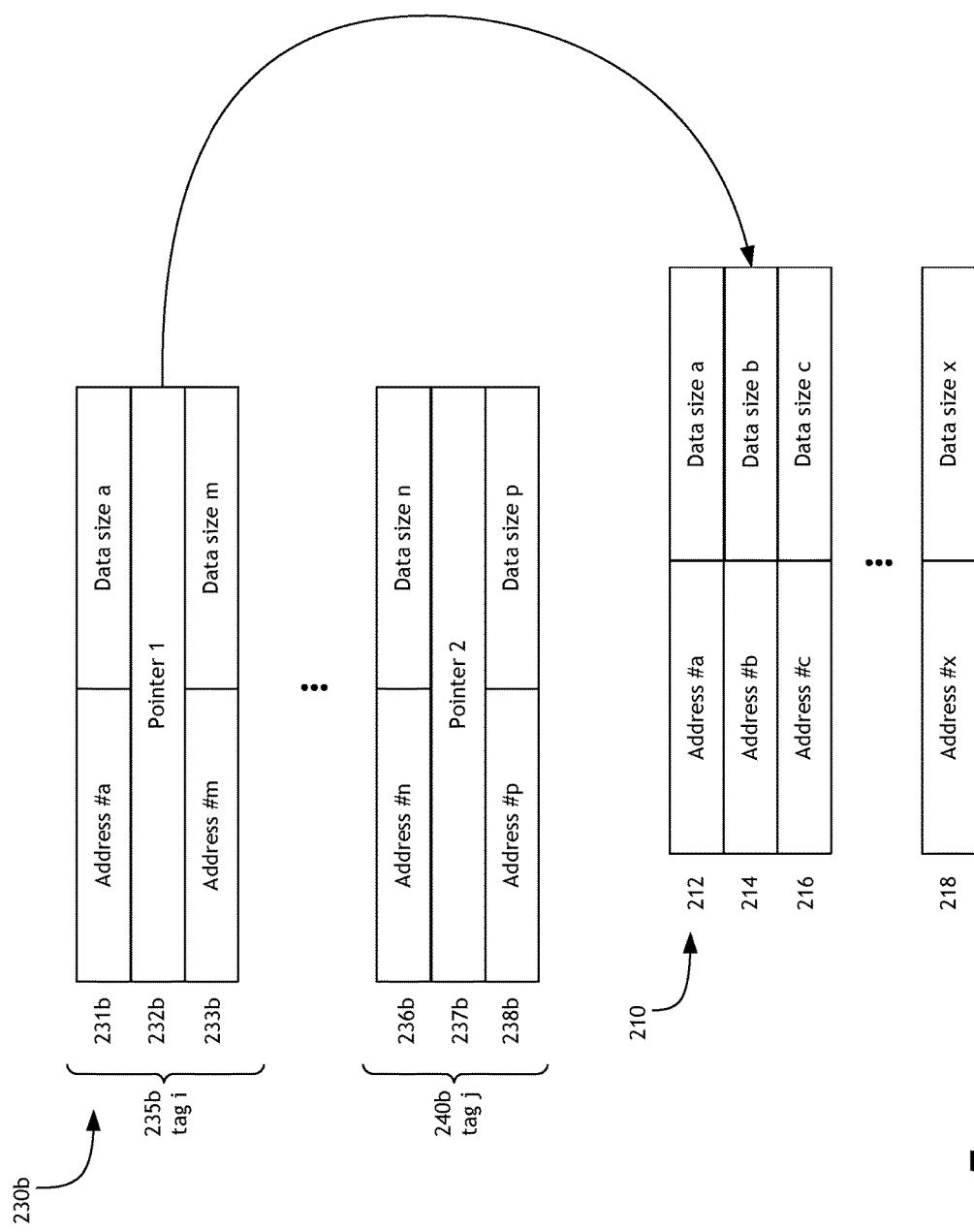
FIG. 5 illustrates a memory access table and a scatter gather list according to another embodiment of the invention.

FIG. 5 illustrates a memory access table 230b and a scatter gather list 210 according to another embodiment of the invention. As is explained above, entries of memory access table 230b can be grouped into groups 235b (corresponding tag i, which is associated with entries 231b, 232b, and 233b), 240b (corresponding to tag j, which is associated with entries 236b, 237b, and 238b), etc. Some of the entries of the memory access table 230b (e.g., entry 231b) can comprise an address, such as a physical address in memory 250, and size of data associated with the address. Other entries of the memory access table 230b can comprise an address or a pointer to a corresponding SGL 210 entry. For example, entry 232b can point to entry 214 of the SGL 210. This may associate the memory access table 230b with one or more SGL entries starting with entry 214. In one embodiment, such one or more SGL entries may be consecutive entries. For instance, the one or more SGL entries associated with memory access table entry 232b may be entries corresponding to addresses #b through #n (which precedes address #m of memory access table entry 233b). In another embodiment, such one or more SGL entries may be nonconsecutive entries.

In some embodiments, the number of entries N in a grouping (e.g., 235b) of the memory access table 230b can be any suitable number, such as 3, 4, 5, 10, etc. Using this approach, the size of the memory access table 230b can be smaller than the size of the memory access table 230a, as memory access table 230b has fewer entries. Such reduction in the size of the memory access table can be particularly suitable for generating memory access tables corresponding to heavily fragmented scatter gather lists. For example, when the memory access table 230b has three entries in a grouping (N=3), an entry having an address or pointer to a corresponding SGL entry can provide a layer of indirection that allows for reduction of the number of entries in the grouping and, consequently, reduction of the number of entries in the memory access table. A suitable tradeoff between reducing the number of entries and performing additional look-up operations can be achieved.

Figure 6:
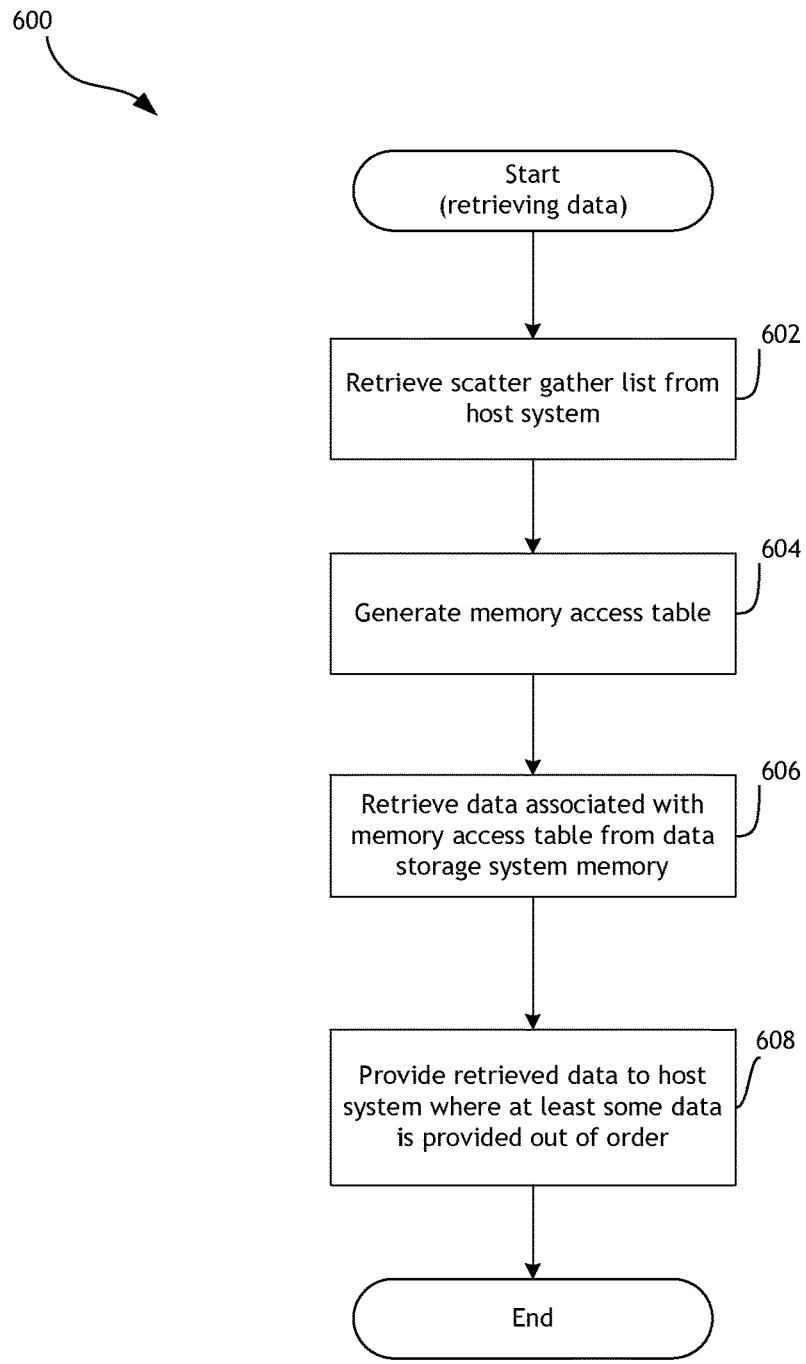
FIG. 6 is a flow diagram illustrating a process of retrieving data using out-of-order data transfer according to one embodiment of the invention.

FIG. 6 is a flow diagram illustrating a process of retrieving data using out-of-order data transfer according to one embodiment of the invention. The process 600 can be executed by the controller 130 and/or the data transfer module 132. The process 600 starts in block 602 where it retrieves the SGL 210 from the host system 110. In block 604, the process 600 generates a memory access table (e.g., 230a and/or 230b) based on the retrieved SGL 210. In block 606, the process 600 retrieves data associated with the generated memory access table from the data storage system memory 250. Data corresponding to memory access table entries can be retrieved out of order. For example, the process 600 can direct a series of data retrieval operations to the memory 250. Each data retrieval operation can be associated with a memory access table entry and can specify an address and data size associated with the memory access table entry. Due to the physical layout and/or architecture of the memory 250, data may be retrieved not in the same order as the order of data retrieval operations directed to the memory 250. This may be particularly applicable when memory 250 comprises a non-volatile memory, such as solid-state NAND memory, which includes dies, planes, channels, etc. Consequently, data may be retrieved in an order that is different from the order of entries in the memory access table and the order of entries in the SGL 210 (e.g., the order of the entries in the memory access table can correspond to the order of the entries in the SGL 210).

In block 608, the process 600 provides retrieved data to the host system 110. This can be accomplished by associating memory access table entries corresponding to retrieved data with corresponding SGL entries. Data can be provided to the host system 110 out of order. For example, data can be retrieved out of order, and using the associations between memory access table entries and corresponding SGL 210 entries, data can be provided to the host system 110 without having to buffer and reassemble data so that it is in the expected order. After providing retrieved data to the host system, the process 600 terminates.

Figure 7:
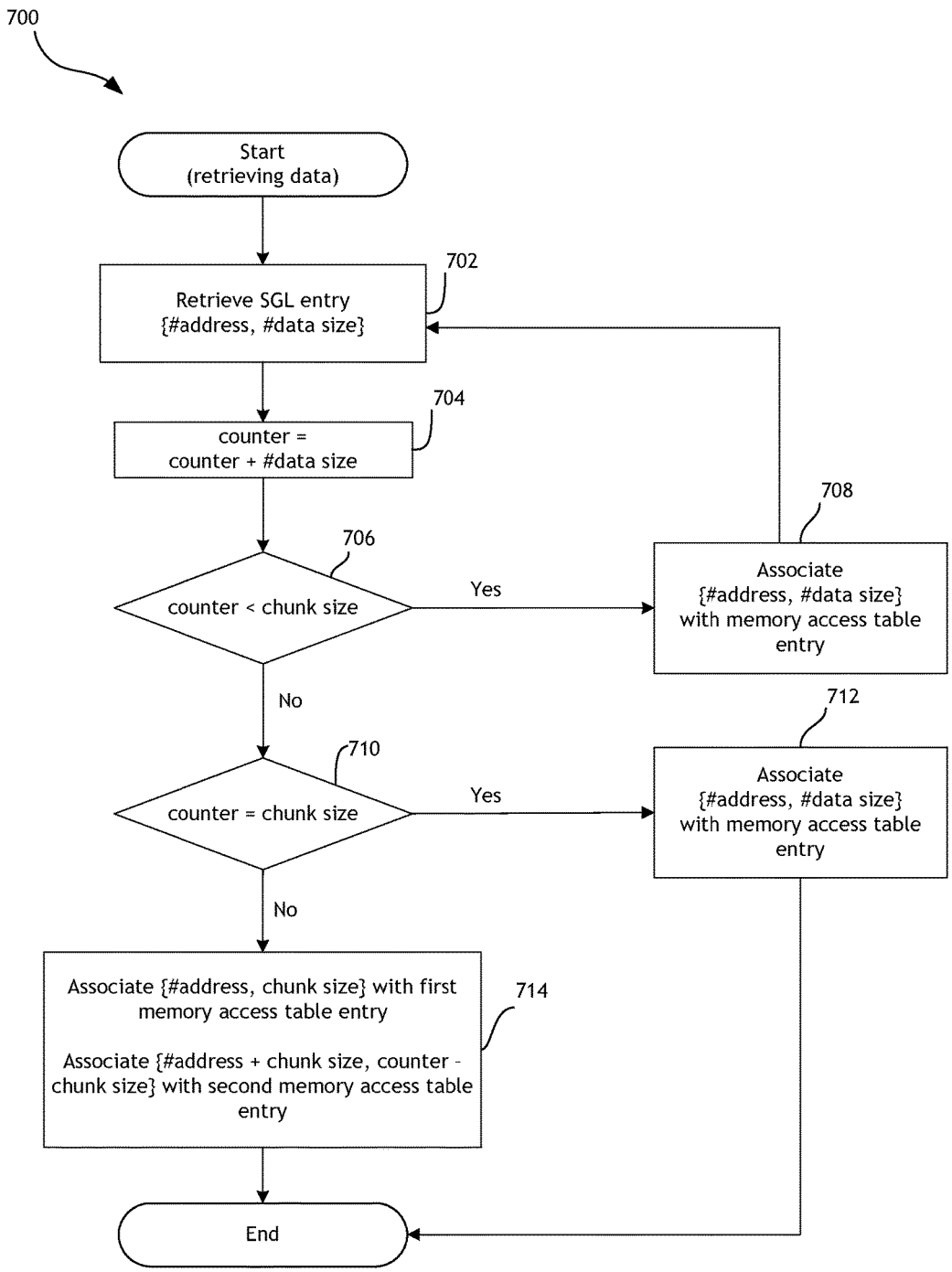
FIG. 7 is a flow diagram illustrating a process of retrieving data retrieval according to another embodiment of the invention.

FIG. 7 is a flow diagram illustrating a process of retrieving data according to another embodiment of the invention. The process 700 can be executed by the controller 130 and/or the data transfer module 132. In one embodiment, the process 700 can correspond to block 606 of FIG. 6. The process 700 starts in block 702 where it retrieves data associated with a SGL 210 entry from the memory 250. The SGL 210 entry can be associated with a memory access table (e.g., 230a and/or 230b) entry. In block 704, the process 700 increments the counter by the data size corresponding to the retrieved data. In one embodiment, the counter can be reset with each new data retrieval operation associated with a SGL and/or memory access table entry. In block 706, the process 700 determines whether the counter is less than the chunk size of the memory 250. If the counter is less than the chunk size, the process 700 transitions to block 708 where it associates the retrieved data with its corresponding memory access table entry, after which the process transitions to block 702 to fetch the next SGL 210 entry. Data retrieved from memory 250 can be subsequently returned to the host system 110.

If the counter is not less than the chunk size, the process transitions to block 710 where it determines whether the counter is equal to the chunk size. If this is the case, the SGL 210 entry fetched in block 702 corresponds to the last entry of a chunk. For example, with reference to FIG. 4, the SGL entry can be associated with the memory access table 230a entry 234a. With reference to FIG. 7, the process 700 transitions to block 712, where it associates the retrieved data with its corresponding memory access table entry. After performing the operations in block 712, the process 700 terminates.

If the counter is greater than the chunk size, which indicates that the retrieved data spans across a chunk boundary, the process 700 transitions to block 714. Here, the retrieved data is associated with two memory access table entries. The first memory access table entry is associated with the address of the retrieved data (e.g., the starting address) and the chunk size. This entry can correspond to the last entry of a chunk. The second memory access table entry is associated with the address corresponding to the address of the retrieved data+chunk size, which corresponds a first entry of the next chunk, and size corresponding to counter−chunk size, which corresponds to the remaining size of the retrieved data. In one embodiment, the first and second memory access table entries are consecutive entries. In another embodiment, the first and second memory access table entries are nonconsecutive entries. After completing block 714, the process 700 terminates.

Conclusion

Embodiments of the data storage system disclosed herein are configured to perform out-of-order data transfer. In one embodiment, a data storage system can retrieve from a host system a SGL associated with a data read command and generate a memory access table based on the SGL. The data storage system can further retrieve data from memory, and at least some data may be retrieved out of order. Retrieved data can be provided to the host system using the memory access table, and at least some data may be provided out of order. Data retrieval performance can be increased which may be manifested by the improvements in the efficiency and speed of the data transfer process.

OTHER VARIATIONS

Those skilled in the art will appreciate that in some embodiments, out-of-order data transfer mechanisms disclosed herein can be during writing or programming data to a data storage system memory. Further, out-of-order data transfer mechanisms disclosed herein can be utilized irrespective of whether a scatter and gather process is used during data transfer. Additional system components can be utilized, and disclosed system components can be combined or omitted. The actual steps taken in the disclosed processes, such as the processes illustrated in FIGS. 6 and 7, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
a non-volatile memory array; and
a controller configured to:
receive a read data command from a host system;
retrieve from the host system a scatter gather list (SGL) associated with the read data command, the SGL comprising a plurality of entries associated with a plurality of logical addresses corresponding to logical data units stored in the non-volatile memory array;
generate a memory access table using the SGL, the memory access table comprising a plurality of entries, wherein the plurality of entries includes a respective plurality of physical addresses translated from the plurality of logical addresses of the logical data units, wherein one of the plurality of logical addresses corresponding to one of the logical data units is associated with more than one of the plurality of physical addresses in the memory access table, and wherein one of the plurality of entries in the memory access table comprises a pointer to one of the plurality of entries in the SGL;
generate, based at least in part on the memory access table, a plurality of requests to retrieve the logical data units stored in the non-volatile memory array and retrieve the logical data units, wherein at least some of logical data units are retrieved not in the same order as an order of the retrieval requests or an order of entries in the SGL; and
provide to the host system, based at least in part on the memory access table, at least some of the logical data units retrieved not in the same order as the order of the plurality of retrieval requests.

2. The data storage system of claim 1, wherein the plurality of entries of the memory access table are associated with a plurality of entries of the SGL and wherein the plurality of logical data units retrieved from the non-volatile memory array are associated with the plurality of entries of the memory access table.

3. The data storage system of claim 1, wherein the controller is further configured to:
determine that a retrieved logical data unit is associated with first and second entries of the memory access table, and
divide the retrieved logical data unit into a first portion associated with the first entry of the memory access table and a second portion associated with the second entry of the memory access table.

4. The data storage system of claim 1, wherein the plurality of requests comprises first and second requests, the first request associated with a first entry of the SGL and the second request associated with a second entry of the SGL that follows the first entry of the SGL, and wherein the controller is further configured to:
retrieve at least some logical data units for the second request prior to retrieving at least some logical data units for the first request; and
provide to the host system the at least some logical data units for the second request prior to providing to the host system the at least some logical data units for the first request.

5. The data storage system of claim 1, wherein the plurality of entries of the memory access table comprise a first group of consecutive entries none of which include a pointer to at least one of the entries of the SGL and a second group of consecutive entries wherein all of the entries in the second group include a pointer to at least one of the entries of the SGL.

6. The data storage system of claim 5, wherein at least one entry of the memory access table is associated with a third group of entries in the SGL, and wherein the controller is further configured to access the SGL to retrieve information associated with the entries in the third group of the SGL.

7. The data storage system of claim 6, wherein the entries in the third group of the SGL are not consecutive.

8. The data storage system of claim 6, wherein at least some of the entries in the third group of the SGL are not consecutive.

9. The data storage system of claim 5, wherein the number of the entries of the second group of the memory access table is less than that of the entries of the first group of the memory access table.

10. The data storage system of claim 5, wherein the at least one entry of the second group of the memory access table includes neither a physical address for a corresponding entry of the SGL, nor a size of data associated with the physical address.

11. In a data storage system comprising a non-volatile memory array and a controller, a method of executing data storage operations communicated by a host system, the method comprising:

receiving a read data command from the host system;

retrieving from the host system a scatter gather list (SGL) associated with the read data command, the SGL comprising a plurality of entries associated with a plurality of logical addresses corresponding to logical data units stored in the non-volatile memory array;

generating a memory access table using the SGL, the memory access table comprising a plurality of entries, wherein the plurality of entries includes a respective plurality of physical addresses translated from the plurality of logical addresses of the logical data units, wherein one of the plurality of logical addresses corresponding to one of the logical data units is associated with more than one of the plurality of physical addresses in the memory access table, and wherein one of the plurality of entries in the memory access table comprises a pointer to one of the plurality of entries in the SGL;

generating, based at least in part on the memory access table, a plurality of requests to retrieve a plurality of logical data units stored in the non-volatile memory array and retrieving the plurality of logical data units, wherein at least some of the logical data units are retrieved not in the same order as the order of the retrieval requests or the order of the entries in the SGL; and based at least in part on the memory access table, providing to the host system at least some of the logical data units retrieved not in the same order as the order of the plurality of retrieval requests, wherein the method is executed under the control of the controller.

12. The method of claim 11, wherein the plurality of entries of the memory access table are associated with a plurality of entries of the SGL and wherein the plurality of logical data units retrieved from the non-volatile memory array are associated with the plurality of entries of the memory access table.

13. The method of claim 11, further comprising:
determining that a retrieved logical data unit is associated with first and second entries of the memory access table; and
dividing the retrieved logical data unit into a first portion associated with the first entry of the memory access table and a second portion associated with the second entry of the memory access table.

14. The method of claim 11, wherein the plurality of requests comprises first and second requests, the first request associated with a first entry of the SGL and the second request associated with a second entry of the SGL that follows the first entry of the SGL, and wherein the method further comprises:
retrieving at least some logical data units for the second request prior to retrieving at least some logical data units for the first request; and
providing to the host system the at least some logical data units for the second request prior to providing to the host system the at least some logical data units for the first request.

15. The method of claim 11, wherein the plurality of entries of the memory access table comprise a first group of consecutive entries none of which include a pointer to at least one of the entries of the SGL and a second group of consecutive entries wherein all of the entries in the second group include a pointer to at least one of the entries of the SGL.

16. The method of claim 15, wherein at least one entry of the memory access table is associated with a third group of entries in the SGL, and wherein the method further comprises accessing the SGL to retrieve information associated with the entries in the third group of the SGL.

17. The method of claim 16, wherein the entries in the third group of the SGL are consecutive.

18. The method of claim 16, wherein at least some of the entries in the third group of the SGL are not consecutive.

* * * * *